United States Patent
Wechlin et al.

(10) Patent No.: US 9,623,763 B2
(45) Date of Patent: Apr. 18, 2017

(54) METHOD FOR DETECTING AN ELECTRICALLY CONDUCTIVE FOREIGN BODY IN A REGION OF A DEVICE FOR INDUCTIVELY TRANSMITTING ELECTRICAL ENERGY AND DEVICE FOR INDUCTIVELY TRANSMITTING ELECTRICAL ENERGY

(75) Inventors: Mathias Wechlin, Kandern (DE); Pascal Asselin, Riedisheim (FR)

(73) Assignee: CONDUCTIX—WAMPFLER GMBH, Weil am Rhein (DE)

( * ) Notice: Subject to any disclaimer, the term of this patent is extended or adjusted under 35 U.S.C. 154(b) by 649 days.

(21) Appl. No.: 14/122,262

(22) PCT Filed: May 24, 2012

(86) PCT No.: PCT/EP2012/059703
§ 371 (c)(1),
(2), (4) Date: Feb. 18, 2014

(87) PCT Pub. No.: WO2012/160136
PCT Pub. Date: Nov. 29, 2012

(65) Prior Publication Data
US 2014/0191715 A1    Jul. 10, 2014

(30) Foreign Application Priority Data
May 26, 2011   (DE) ......... 10 2011 050 655

(51) Int. Cl.
*H02J 7/00*    (2006.01)
*B60L 11/18*   (2006.01)
(Continued)

(52) U.S. Cl.
CPC ......... *B60L 11/1851* (2013.01); *B60L 11/182* (2013.01); *B60L 11/1824* (2013.01);
(Continued)

(58) Field of Classification Search
USPC ........................................ 320/108
See application file for complete search history.

(56) References Cited

U.S. PATENT DOCUMENTS

| 7,554,316 B2 | 6/2009 | Stevens et al. |
| 7,605,496 B2 | 10/2009 | Stevens et al. |

(Continued)

FOREIGN PATENT DOCUMENTS

| DE | 202009009693 | 11/2010 |
| KR | 100992480 | 11/2010 |

(Continued)

OTHER PUBLICATIONS

English translation of International Search Report (ISR) published Jun. 3, 2013 for International Patent Application No. PCT/EP2012/059703 filed on May 24, 2012.

(Continued)

*Primary Examiner* — Eric Lee
(74) *Attorney, Agent, or Firm* — Paul D. Bianco; Katharine Davis; Fleit Gibbons Gutman Bongini & Bianco PL (57) ABSTRACT

In a method for detecting an electrically conductive foreign body at a device for inductively transmitting electrical energy from a stationary unit having an electrical power supply unit and a primary inductor to a mobile unit having a secondary inductor and an electric load, electrical power is initially fed from the electrical power supply unit into the primary inductor and the feed-in is interrupted. The curve over time of the resulting decay of an electrical operating variable of the primary inductor is measured and at least one parameter of the measured curve is compared with a corresponding parameter of a reference curve in the event of an interruption of the power feed-in into the primary inductor without the presence of an electrically conductive foreign body. The comparison is used to determine whether an (Continued)

electrically conductive foreign body is present in the region of the magnetic field produced by the primary inductor.

17 Claims, 3 Drawing Sheets

(51) Int. Cl.
*H02J 5/00* (2016.01)
*H02J 7/02* (2016.01)

(52) U.S. Cl.
CPC ........... *B60L 11/1829* (2013.01); *H02J 5/005* (2013.01); *H02J 7/025* (2013.01); *B60L 2210/30* (2013.01); *B60L 2210/40* (2013.01); *B60L 2270/147* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | |
|---|---|---|
| 7,868,587 B2 | 1/2011 | Stevens et al. |
| 8,035,340 B2 | 10/2011 | Stevens et al. |
| 8,039,995 B2 | 10/2011 | Stevens et al. |
| 8,508,077 B2 | 8/2013 | Stevens et al. |
| 2007/0216392 A1* | 9/2007 | Stevens .................. H02J 5/005 323/355 |
| 2007/0228833 A1 | 10/2007 | Stevens et al. |
| 2009/0134713 A1 | 5/2009 | Stevens et al. |
| 2009/0322158 A1 | 12/2009 | Stevens et al. |
| 2011/0006613 A1 | 1/2011 | Stevens et al. |
| 2011/0049997 A1 | 3/2011 | Urano |
| 2011/0285210 A1 | 11/2011 | Lemmens et al. |
| 2011/0285214 A1 | 11/2011 | Stevens et al. |
| 2011/0291491 A1 | 12/2011 | Lemmens et al. |
| 2012/0068536 A1 | 3/2012 | Stevens et al. |
| 2012/0175967 A1 | 7/2012 | Dibben et al. |

FOREIGN PATENT DOCUMENTS

| | | |
|---|---|---|
| WO | 2005109597 | 11/2005 |
| WO | 2005109598 | 11/2005 |
| WO | 2009081115 | 7/2009 |

OTHER PUBLICATIONS

Written Opinion for International Application PCT/EP2012/059703 filed on May 24, 2012.

English translation of International Preliminary Report on Patentability published Nov. 26, 2013 for PCT/EP2012/059703 filed on May 24, 2012.

English translation of Written Opinion published Nov. 26, 2013 for PCT/EP2012/059703 filed on May 24, 2012.

* cited by examiner

METHOD FOR DETECTING AN ELECTRICALLY CONDUCTIVE FOREIGN BODY IN A REGION OF A DEVICE FOR INDUCTIVELY TRANSMITTING ELECTRICAL ENERGY AND DEVICE FOR INDUCTIVELY TRANSMITTING ELECTRICAL ENERGY

FIELD OF THE INVENTION

The invention concerns a method for detecting an electrically conductive foreign body on a device for inductively transmitting electrical energy and a corresponding device.

BACKGROUND OF THE INVENTION

Devices of the aforesaid type are used for the inductive charging of a rechargeable battery incorporated into an electric vehicle. During the transmission of energy, a magnetic field with a high field strength and flux density is built up between a stationary primary coil and a secondary coil on the vehicle. This is necessary in order to induce in the secondary coil a high current sufficient for the desired transmission power.

If objects made of metal materials are introduced into the region of such a field, then eddy currents are induced in them, and those currents lead to a warming, which is dependent on the material, the introduction time, and the level of the field strength. In the presence of appropriate conditions, such an object can reach a temperature that can lead to damage, for example, melting in plastic surfaces, or to putting persons at risk. The latter appears, in particular, if the secondary side was removed and heated metal objects are freely accessible and can be touched by persons.

As a result of the characteristics of previous uses for inductive energy transmission systems, a corresponding risk by metal foreign bodies was evaluated as not relevant or, for example, with industrial vehicles (AGV), the attempt was made to remove such objects from critical field regions by brushes placed in front of the secondary consumers. With vehicles with drivers, training procedures can call attention to such objects in operation and to remove them before starting the inductive transmission or, in case of doubt, not to operate the inductive transmission. For an extensive automatic operation or with high safety requirements, of which, in particular, one can start with the use of such systems in publicly accessible areas, safety measures appear to be unsuitable or at least insufficient up to now.

From WO 2009/081115 A1, a method is known for detecting an electrically conductive foreign body on a device for the inductive transmission of electrical energy, in which, temporarily, the primary voltage is increased and the reaction of the system is observed. Normally, in this case, a corresponding reduction of the primary current takes place as a result of a secondary power regulation, which maintains the transmitted power constant. A conductive foreign body on the primary coil, however, ensures an increase of the primary power, in this case, due to a power loss, and by means of this increase, can be detected. With the detection of a foreign body, the primary voltage is turned off, so as to avoid a heating of the foreign body. In this state of the art, it is problematic that a small foreign body is difficult to detect, since the primary voltage cannot be substantially increased in comparison to its nominal value.

From WO 2005/109598 A1, a system for the inductive transmission of electrical energy to portable electronic devices, such as mobile communication devices, is known, in which, for the detection of a nonexisting secondary load or a parasitic load in the form of a foreign body, the primary power supply is briefly interrupted and the curve over time of the decay of the energy stored in the circuit is measured. Upon detecting a nonexisting secondary load or a parasitic load in the form of a foreign body with the aid of the decay process, the system goes into a standby or switch-off state, in which the power supply is still briefly turned on only during periodic intervals, so as to once more trigger a decay process and, in this way, to test whether the state that led to the standby or switch-off state continues or has changed. The standby state and the switch-off state differ merely in that in the switch-off state, a prompt calling for a removal of a parasitic load is emitted on a user interface.

A similar system is known from WO 2005/109597 A1; in that system, the decision to pass over to the standby or switch-off state is made with the aid of a comparison between the primary power delivery and the secondary power need. To this end, information regarding the secondary power need must be transmitted to the primary side. The behavior of the primary side in the standby and switch-off state corresponds to the previously mentioned state of the art, that is, a brief primary power supply takes place merely at periodic intervals, so as to determine whether the last-detected system state continues or has changed and the standby state and the switch-off state differ merely due to a display on a user interface.

SUMMARY OF THE INVENTION

The invention is based on the goal of specifying a new solution for handling the problem of the presence of an electrically conductive foreign body in the region of an inductive energy transmission system, which contributes to improvement of the operational safety and reliability of such a system.

This goal is attained in accordance with the invention by a method with the features of claim 1 and a corresponding device with the features of claim 13 or claim 14. Advantageous developments are indicated in the subordinate claims.

In accordance with the invention, electric power from a power supply unit is first fed into the primary coil, this feed-in is interrupted, and the curve over time of the thus caused decay of an electric operating variable of the primary coil is measured. At least one parameter of the measured curve is compared with a corresponding parameter of a reference curve, which was previously determined without the presence of an electrically conductive foreign body. With the aid of this comparison, a determination is made as to whether an electrically conductive foreign body is present in the region of the magnetic field produced by the primary coil. In this way, the presence of a conductive foreign body can be detected with high accuracy, since such a decay process without a conductive foreign body is essentially determined only by the low losses of the primary coil and therefore is already clearly changed by the presence of a small foreign body.

The method in accordance with the invention and the device in accordance with the invention, however, permit not only a determination as to whether or not a foreign body is present, but, moreover, from the curve over time of the decay of the measured electric operating variable, the determination of the degree to which the power is consumed by the foreign body during the normal operation of the device. With the aid of this degree of consumed power, the power fed into the primary coil can be reduced to such an extent that the power consumed by the foreign power remains below a predefined threshold. In this way, an emergency operation is made possible, in which the power is diminished to such an extent that the power consumption of the foreign body is not a danger and can be tolerated. With respect to the use for charging the battery of an electric vehicle, this is of great advantage because, in this way, the charging function can still be at least partially fulfilled and the mobility of the vehicle can be retained in many cases.

It is expedient if the parameter used as a decision criterion is a relative change in the measured electric operating variable within a predefined time interval since the interruption of the power feed-in or the length of the time interval from the interruption of the power feed-in to the attaining of a predefined relative change in the measured electric operating variable. By the consideration of relative changes, the dependence of absolute values of electric variables, which are influenced by many factors and can drift long-term as a result of ageing processes, is avoided.

Furthermore, it is very expedient to minimize the influence of the secondary side on the foreign body detection on the primary coil, since this makes possible, in particular, a periodic foreign body detection with high accuracy during the continuous operation of the energy transmission to the secondary side. To this end, in accordance with the invention, the power supply on the secondary side from the secondary coil to the consumer is interrupted before the interruption of the power feed-in to the primary coil, and thus, an influence of the consumer on the decay process of a primary-side operating variable is eliminated.

Other particularly advantageous measures can be deduced from the other subordinate claims.

BRIEF DESCRIPTION OF THE DRAWINGS

Embodiment examples of the invention are described below with the aid of the drawings. The figures show the following.

DETAILED DESCRIPTION OF PREFERRED EMBODIMENTS

Figure 1:
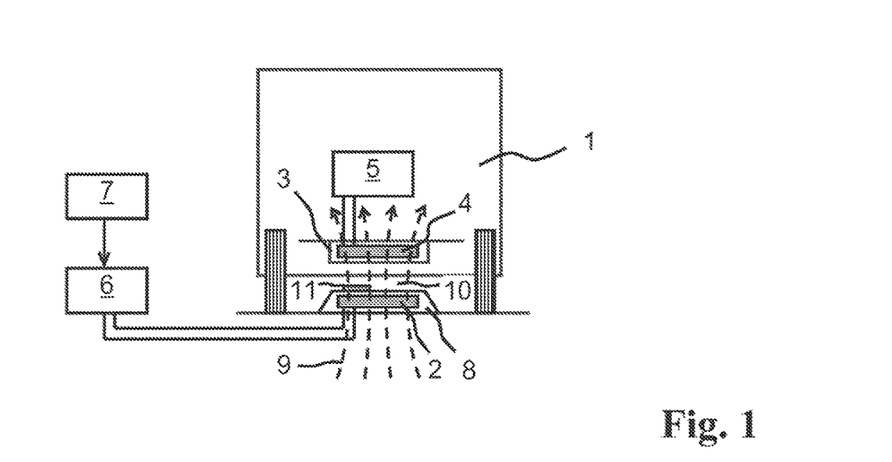
FIG. 1, a schematic representation of a device for the inductive energy transmission from a charging station to an electric vehicle.

FIG. 1 shows in a schematic sectional view an electric vehicle 1, which in order to charge its battery, is above the primary coil 2 of a charging station. On the underside of the vehicle 1, there is a secondary coil 4 in a housing 3, and it is connected as a consumer to a charging electronic system 5. This converts the parameters of the electric power inductively transmitted to the secondary coil 4 into values suitable for the charging of the battery of the vehicle 1. The primary coil 2 is fed by a power supply unit 6 of the charging station and is situated in a housing 8, which is put in a stationary manner on a vehicle placement spot. The power supply unit 6 is controlled by a control unit 7 of the charging station.

In FIG. 1, some field lines 9 of the magnetic alternating field created during operation by the primary coil 2 are indicated as dotted lines. Its main direction corresponds to the direction of the coil axis of the primary coil 2 and is thus the vertical direction. During operation, a high magnetic field strength and flux density prevail in the gap 10 directly above the housing 8 of the primary coil 2.

A metal foreign body 11 is on the housing 8 of the primary coil 2. This may have been detached, for example, from another vehicle that was at the charging station before vehicle 1. It could also be a daily use article lost by a person or an empty beverage can. And not least, the foreign body 11 could also have been intentionally left there by someone with sabotage intentions. As was already explained in the beginning, the foreign body 11 would be heated as a result of eddy currents induced in it if the primary coil 2 becomes energized and in such a way, it would become a source of danger. Moreover, this would impair the efficiency of the transfer of energy to the secondary coil 4.

Figure 2:
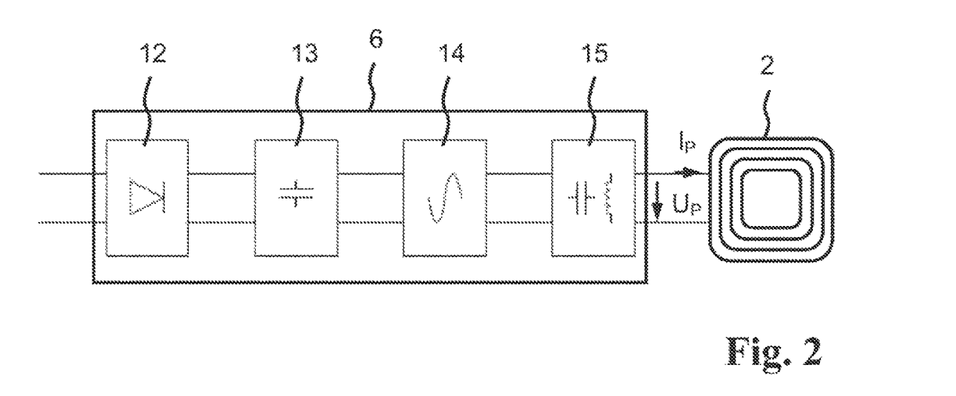
FIG. 2, a block diagram of the primary side of a device for inductive energy transmission.

FIG. 2 shows a block diagram of the power supply unit 6 of FIG. 1 with a primary coil 2 connected to it. The power supply unit 6 comprises a rectifier 12, a direct current voltage-intermediate circuit 13, a converter 14, and a balancing circuit 15, which are connected in the aforementioned sequence one after the other. The rectifier 12 is connected to a power supply network and converts its alternating voltage into a direct current voltage, which is smoothed and buffered in the intermediate circuit 13. The intermediate circuit voltage is converted by a converter 14 into an alternating voltage with a predefined frequency, which is conducted to the primary coil 2 via the balancing circuit 15. The balancing circuit 15 together with the primary coil 2 forms an oscillating circuit and is dimensioned in such a way that this oscillating circuit is in resonance with the frequency predefined by the rectifier 14.

Figure 3:
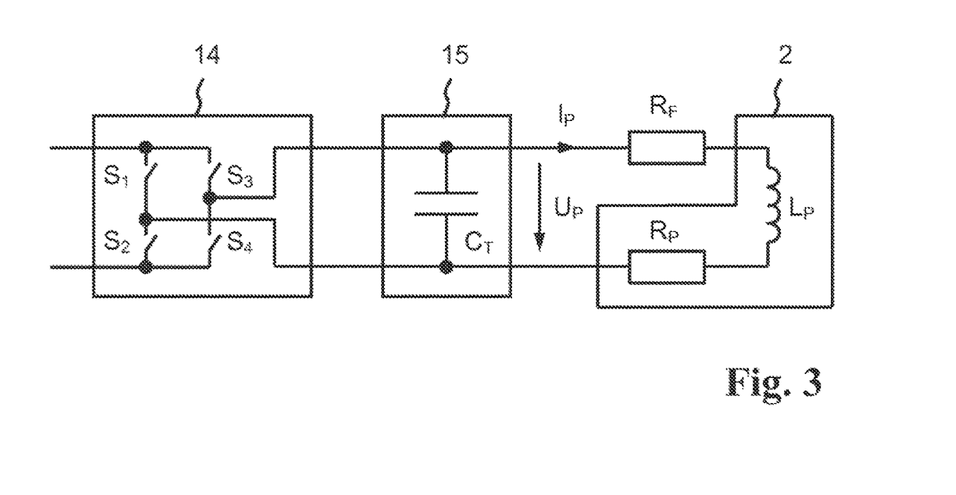
FIG. 3, a detailed circuit diagram of some components of the block diagram of FIG. 1.

A somewhat detailed representation of some of the components of the primary side, namely the rectifier 14, the balancing circuit 15, and the primary coil 2, are shown in FIG. 3. The rectifier 14 is formed as an H-bridge with four switches $S_1$ to $S_4$, which are wired with a nondepicted freewheeling diode. In FIG. 3, the balancing circuit 15 consists merely of a single capacitor $C_T$, which is connected in parallel with the rectifier output 14. In fact, the balancing circuit 15 can be formed in a substantially more complex manner and can contain a large number of components, including inductances, but it is a matter here only of the formation of an oscillating circuit, for which the individual capacitor $C_T$ is basically sufficient, which is assumed here, by way of example, as a balancing circuit 15.

The primary coil 2 contains a primary inductance $L_P$ and in series with it, an ohmic winding resistance $R_P$, which without the presence of a foreign body 11, provides the predominant contribution to the total power loss of the oscillating circuit formed by the primary coil 2 and the balancing circuit 15. Remagnetizing and eddy current losses, also called iron losses, are hereby ignored in field conducting elements, which can be provided on the primary side as well as the secondary side. The frequency with which the switches $S_1$ to $S_4$ are activated is coordinated with the resonance frequency of the oscillating circuit so that it is operated in resonance.

The other resistance $R_F$ in series with the primary coil 2 is a simple model for the conductive foreign body 11, which, when the primary coil 2 is energized, consumes electric power and converts it into heat. Without the presence of the foreign body 11, the value of $R_F$ in FIG. 3 is equal to zero. In order to detect the foreign body 11, one could, for example, measure the primary power and the secondary power of the entire system, and by subtraction determine the power loss caused by the foreign body 11. However, since when charging an electric vehicle 1, in contrast to charging small devices such as mobile telephones or electric toothbrushes, a relatively large power must be transmitted, [and] such a solution would be fraught with a large lack of accuracy, since two relatively large power values would have to be measured and subtracted from one another.

Figure 4:
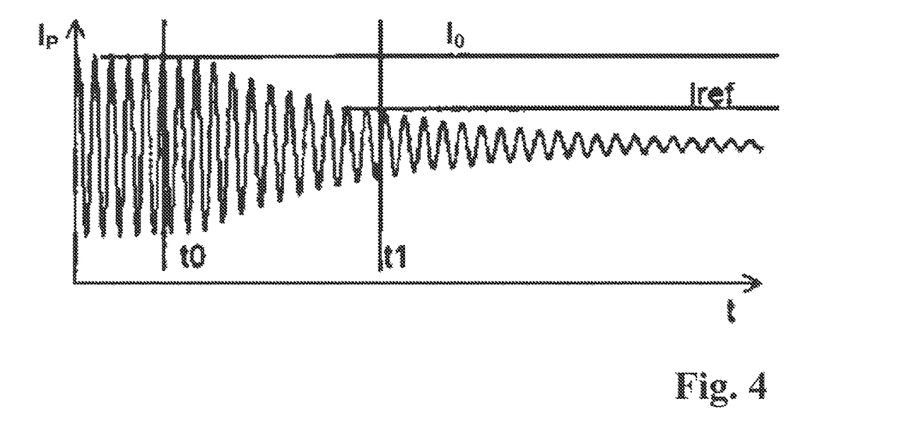
FIG. 4, an exemplary curve of the decay of the primary current with an interruption of the power feed-in without the presence of a conductive foreign body.
Figure 5:
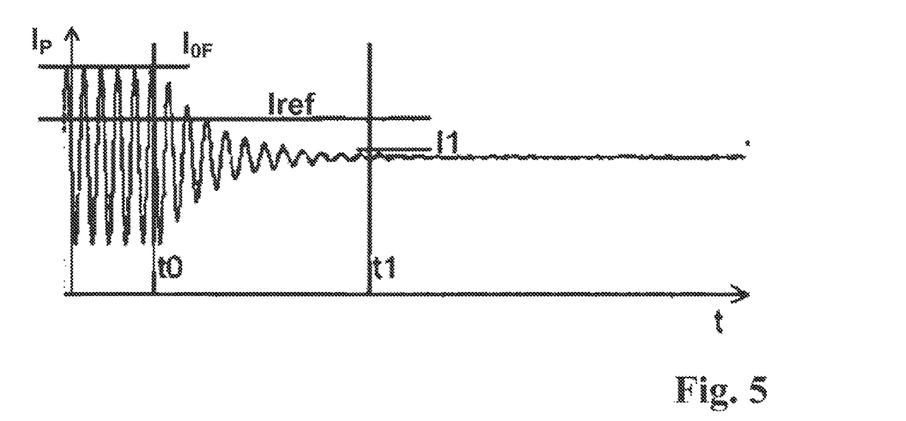
FIG. 5, an exemplary curve of the decay of the primary current with an interruption of the power feed-in with the presence of a conductive foreign body.

In order to attain high accuracy with the foreign body detection, the power feed-in for the primary coil 2 in accordance with the invention is completely interrupted by the rectifier 14 and the decay of the primary current $I_P$ or the primary voltage $U_P$ resulting therefrom is measured. It is clear that this would have to happen very soon after the beginning of an energizing of the primary coil 2, that is, before a foreign body 11 can be heated to such an extent that it becomes a danger. The results of such measurements of the primary current $I_P$ are shown in FIGS. 4 and 5 for two different cases, namely in FIG. 4 without the presence of a foreign body 11, that is, for $R_F$=0, and in FIG. 4 with the presence of a foreign body 11, that is, for $R_F \neq 0$. At the time $t_0$ of the interruption of the power feed-in from the rectifier 14, the primary current $I_P$ has the value $I_0$ in the first case and the value $I_{0F}$ in the second case.

As the two figures show, primary current $I_P$ has the curve of a decaying oscillation. Its envelope curve $I_{PH}(t)$ is, as is known, given by a decaying exponential function $I_{PH}(t) = I_0 \cdot \exp[-(t-t_0)/\tau]$ or $I_{PH}(t) = I_{0F} \cdot \exp[-(t-t_0)/\tau]$, whose time constant $\tau = (2L_P)/(R_P+R_F)$. With the presence of a foreign body 11, that is, for RF$\neq$0, the decay time constant is smaller, that is, the primary current $I_P$ decays faster than without the foreign body 11. The curve of the primary current $I_P$ shown in FIG. 4 is a reference curve, which is uniquely measured and stored without the presence of a foreign body 11, that is, for $R_F$=0, wherein not the entire time curve, but rather only characteristic parameters of the same, such as $I_0$, $I_{ref}$ and $\Delta t = t_1 - t_0$ need to be stored, wherein $I_0$ is the starting value of the envelope curve of $I_P$ at the timepoint $t_0$ of the interruption of the power feed-in, and $I_{ref}$ is the value of the envelope curve of $I_P$ at timepoint $t_1$.

It is clear that in spite of the interruption of the primary power supply, the primary current $I_P$ must be able to continue to flow, so that a decay process of $I_P$, influenced by the additional power loss of a foreign body 11 that may be present, can take place. Depending on the internal topology of the balancing circuit 15, this can mean that a closed current path for the decay process must be created by the switches $S_1$ to $S_4$ of the rectifier 14. If, for example, the balance capacitor $C_T$ were not in parallel, but rather in series with the primary coil 2, then a closed current circuit could be made ready for the oscillating circuit, consisting of the primary coil 2, the serial balance capacitor $C_T$ and perhaps the foreign body resistance $R_F$, by a closed state of the switches $S_2$ and $S_4$ with an opened state of the switches $S_1$ and $S_3$, in spite of the interruption of the power feed-in from the rectifier 14.

In order to determine the presence of a foreign body 11, the value $I_1$ of the primary current $I_P$ can be compared, after expiration of a predefined time interval $\Delta t = t_1 - t_0$ since the interruption of the power feed-in from the rectifier 14, with the reference value $I_{ref}$ measured without the presence of a foreign body 11, wherein $I_1 < I_{ref}$ indicates the presence of a foreign body 11. Alternatively, the length of the time interval between the interruption of the power feed-in at the time point $t_0$ and the attaining of the reference value $I_{ref}$ by the primary current $I_P$ can be compared with the reference time interval $\Delta t = t_1 - t_0$, wherein a shorter time interval than $\Delta t$ indicates the presence of a foreign body 11. This procedure is permissible if the starting value $I_{0F}$ of the primary current with the interruption of the power feed-in in FIG. 5 agrees exactly with the corresponding value $I_0$ of the reference curve in FIG. 4.

In actual practice, however, it may happen that the starting value $I_{0F}$ of the primary current $I_P$ with the interruption of the power feed-in in FIG. 5 differs somewhat from the corresponding value $I_0$ of the reference value in FIG. 4, that is, that the operating state of the system that prevails during the reference measurement is later no longer completely reproducible with the same precision. Therefore, it is preferable to compare the relative change of the primary current $I_P$ between the values $I_{0F}$ and $I_1$ with the relative change between the values $I_0$ and $I_{ref}$ with the reference measurement, that is, instead of the absolute values $I_1$ and $I_{ref}$, to consider the ratios $I_{0F}/I_1$ and $I_0/I_{ref}$.

The starting values $I_0$ and $I_{0F}$ of the primary value $I_P$ need not absolutely be the values prevailing before the interruption of the power feed-in, as is shown in FIGS. 4 and 5, but rather one could also use a value of $I_P$ as starting value, which was measured shortly after the interruption of the power feed-in, that is, the beginning of the time interval $\Delta t$ for the measurement of the decay process of the primary current $I_P$ need not be the timepoint of the interruption of the power feed-in, but rather it could also be shortly after that. As can be seen from FIGS. 4 and 5, in this case also, the change of the decay behavior due to the presence of a foreign body 11 could also be detected.

With the detection of a foreign body 11, the power feed-in to the primary coil 2, which was in any case interrupted for the measurement, can in the simplest case remain interrupted, and a display can be activated and/or a report can be sent to a higher level unit and/or the user of the electric vehicle 1. However, it is also possible for a foreign body 11 to have a size that would be a danger when the system is operated with a nominal power, but would be tolerable when operated with a reduced power. In this case, it is of interest to make possible such an operation with a reduced power, in particular if a quick elimination of the foreign body 11 does not appear to be possible.

In order to make possible an operation with a reduced power, in spite of the presence of a foreign body 11, the size of the foreign body 11, that is, its power consumption when operated normally with a nominal power, must be quantitatively determined, so that the power supplied by the rectifier 14 can be lowered to a value at which the power consumption of the foreign body 11 is no longer a danger. This quantitative determination of the power loss consumed by a foreign body 11 can take place with the aid of a circuit model of FIG. 3 and the measured curves over time in accordance with FIGS. 4 and 5.

On the basis of the formula for the exponential curve of the envelope curve of the primary current $I_P(t)$, the following is valid for the reference current curve of FIG. 4:

$$I_{ref} = I_0 \exp[-(t_1-t_0)/\tau_{ref}]$$

with the time constant $\tau_{ref} = (2L_P)/R_P$

From this, it is possible to calculate the value of $R_P$:

$$R_P = [2L_P/(t_1-t_0)] \cdot [-\ln(I_{ref}/I_0)]$$

The following is analogous for the current curve with the presence of foreign body 11 of FIG. 5:

$$I_1 = I_{0F} \exp[-(t_1-t_0)/\tau_1]$$

with the time constant $\tau_1 = (2L_P)/(R_P+R_F)$
From this, the sum $R_P+R_F$ can be calculated:

$$R_P R_F = [2L_P/(t_1-t_0)] \cdot [-\ln(I_1/I_{0F})]$$

Thus, the following is the result for $R_F$ by subtraction of $R_P$:

$$R_F = [2L_P/(t_1-t_0)] \cdot \ln\,[(I_{ref} \cdot I_{0F})/(I_1 \cdot I_0)]$$

The inductance $L_P$ of the primary coil 2 entering into the time constants $\tau_{ref}$ and $\tau_1$ is either known, or it can be approximately determined as $L_P = U_P/(\omega I_P)$, with the assumption that $\omega L_P \gg R_P + R_F$, and for this reason, the primary voltage $U_P$ must also be measured in addition to the primary current $I_P$.

The power loss $P_F$ due to a primary current $I_P$ with the effective value $I_{Peff}$ in a foreign body 11 with the effective resistance $R_F$ is:

$$P_F = R_F \cdot I_{Peff}^2$$

If the maximum tolerable power loss of a foreign body 11 has the value $P_{Fmax}$, then the result for the maximum permissible effective value $I_{Pmax}$ of the primary current $I_P$ is as follows:

$$I_{Pmax} = \sqrt{P_{Fmax}/R_F}$$

Insertion of $R_F$ produces the following:

$$I_{Pmax} = \sqrt{\frac{P_{Fmax}}{\frac{2L_P}{(t_1-t_0)} \ln\left(\frac{I_{ref} \cdot I_{0F}}{I_1 \cdot I_0}\right)}}$$

The effective value of the primary current $I_P$ can be adjusted to a desired value by the rectifier 14 by control of the switches $S_1$ to $S_4$. In this way, it is possible to still transmit power that is reduced in comparison to the nominal power of the system, even with the presence of a conductive foreign body 11. When charging an electric vehicle 1, an incomplete charging as a result of a reduced transmission power is in any case preferable to completely omitting a charging when a foreign body is present, so as to still make possible at least a limited mobility.

When an electric vehicle 1 is already in the charging position in accordance with FIG. 1, then the secondary coil 4 and the charging electronic system 5 can influence the curve of the primary current $I_P$ with an interruption of the primary-side power feed-in from the rectifier 14, because of the inductive coupling of the secondary coil 4 with the primary coil 2. This influence must be taken into consideration, that is, must be eliminated if possible or at least minimized.

Figure 6:
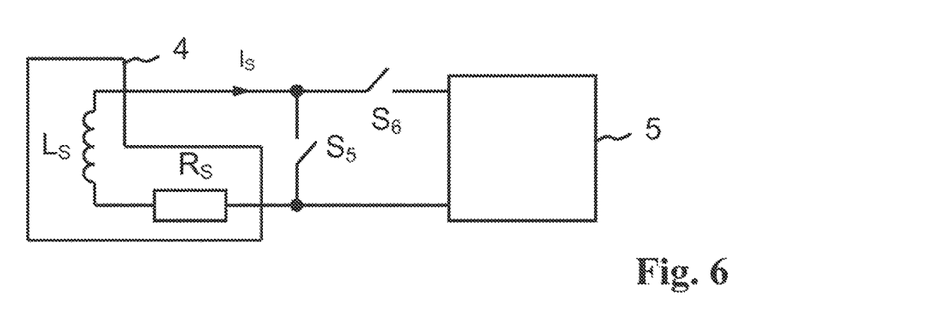
FIG. 6, a partial circuit diagram of the secondary side of a device for inductive energy transmission.

As FIG. 6 shows, in this respect, the secondary coil 4, which can be shown analogous to the primary coil 2 by a secondary inductance $L_S$ and a winding resistance $R_S$ wired in a series with it, is connected to the charging electronic system 5, which contains a balancing circuit that is not depicted in FIG. 6 for the formation of an oscillating circuit, via two switches $S_5$ and $S_6$, through which a short-circuit of the secondary coil 4 can be produced or the current circuit between the secondary coil 4 and the charging electronic system 5 can be interrupted.

In the carrying out of the detection of the foreign body in accordance with the invention, the switch position, which is shown in FIG. 6 and in which the two switches $S_5$ and $S_6$ are open, is advantageous, since in this case a secondary current $I_S$ cannot flow in the secondary coil 4. In this way, additional losses on the secondary side are avoided and the preceding statements regarding FIGS. 3 to 5 are valid without restriction. It is clear that for control of the secondary switches $S_5$ and $S_6$, a suitable communication connection must exist between the control unit 7 of the charging station and a corresponding control unit on board the vehicle 1.

Alternatively, the secondary coil 4 can be short-circuited by means of the switch $S_5$. Also, in this way, the power flow to the charging electronic system 5 is interrupted; the secondary current $I_S$, however, can continue to flow through the secondary inductance $L_S$ and the winding resistance $R_S$. The latter absorbs a power loss $P_S = R_S \cdot I_{Seff}^2$ in this case, wherein $I_{Seff}$ is the effective value of the secondary current $I_S$. Since $I_{Seff}$ is proportional to $I_{Peff}$, the secondary winding resistance $R_S$ manifests itself on the primary side like an additional resistance $k \cdot R_S$ in series with the primary winding resistance $R_P$, wherein $k = I_{Seff}/I_{Peff}$ is a proportionality factor. In the preceding formulas, then, $R_P$ is to be replaced by $R_P' = R_P + k \cdot R_S$. Otherwise, the foreign body detection and the determination of the primary current $I_{Pmax}$, which is still permissible in spite of a foreign body 11, take place as described before.

Figure 7:
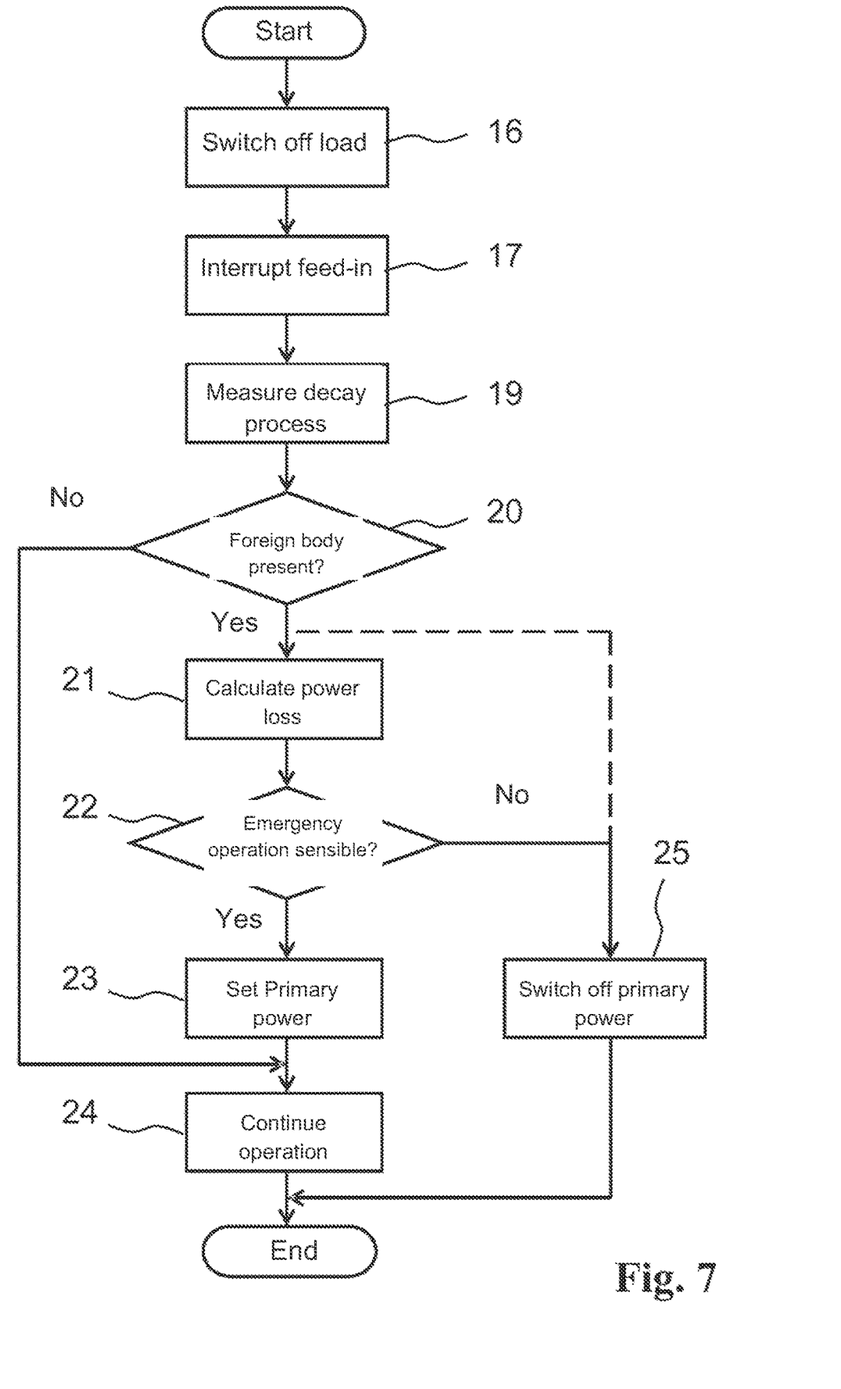
FIG. 7, a summary representation of the method in accordance with the invention in the form of a program flow chart.

FIG. 7 gives a coherent overview of a preferred embodiment example of the method in accordance with the invention in the form of a program flow chart. The method begins in step 16 with the switching off of the consumer, that is, that on the secondary side, either the two switches $S_5$ and $S_6$ are opened, or first the short-circuit switch $S_5$ lying parallel to the secondary coil 4 is closed and then the circuit breaker $S_6$ lying in the current circuit and leading to the charging electronic system 5 is opened. It is clear that step 16 is only necessary if a secondary side is present.

Subsequently, in step 17, the power feed-in from the rectifier 14 is interrupted in the oscillating circuit consisting of the balancing circuit 15 and the primary coil 2. In step 19, then, the decay of the primary current $I_P$ is measured. In step 20, a decision is made by comparing the deviation of the ratio $I_{0F}/I_1$ from the ratio $I_0/I_{ref}$ with a threshold value as to whether an electrically conductive foreign body 11 is present or not in the region of the magnetic field of the primary coil 2.

If the comparison in step 20 is positive, then, in step 21, a measure for the power loss consumption of the foreign body 11 in the form of its replacement resistance $R_F$ is calculated. On the basis of the result of this calculation, an examination is made in the following step 22 as to whether an emergency operation with a reduced transmission power is sensible, that is, whether significant power can still be transmitted. If the comparison in step 22 is positive, then, in step 23, the primary power is adjusted via the rectifier 14 to a value that is reduced in comparison to the nominal value, in which the power loss of the foreign body is still tolerable. Subsequently, in step 24, the power feed-in from the rectifier 14 is again consumed in the primary coil 2 and the consumer, that is, the charging electronic system 5, is again turned on, in that the circuit breaker $S_6$ is closed and the short-circuit switch $S_5$ is opened. The foreign body detection and treatment is thus ended.

The continuation of the operation in step 24 then takes place immediately after step 20, with the circumvention of steps 21 to 23, if the comparison in step 20 is negative, that is, a foreign body is detected. If, in step 22, the decision is made that because of the size of the foreign body, a sensible emergency operation with reduced power is not possible, then, in step 25, the feed-in of primary power is permanently shut off. Alternative to the calculation of the power loss consumption of the foreign body 11 in step 21, one can also go over immediately to step 25 with a positive comparison result in step 20 in a simplified embodiment of the invention, and the primary power can basically be turned off permanently. This variant is shown in FIG. 7 with a dotted line.

In FIG. 7, the activation of a display and/or the sending of a report to a higher level unit and/or the user of the electric vehicle are/is not shown. Such measures basically take place whenever the comparison in step 20 is positive, since the presence of a foreign body is always a disturbance that, depending on its extent, must be eliminated sooner or later. With a very small foreign body, which results in only a slight reduction of the transmission power, a display that indicates to the vehicle user the disturbance upon returning to the vehicle may be sufficient. With a large foreign body, which also makes impossible an emergency operation, on the other hand, it appears necessary to immediately alert the vehicle user to the fact that the electric vehicle 1 cannot be charged, for example, by a horn signal or by sending of a text report to a mobile telephone. With a significant reduction of the charging power in an emergency operation also, it appears sensible to make the user aware in this manner as to the disturbance early on, since it has a negative effect on the mobility of the vehicle.

An abnormally rapid decay of an electric operating variable of the primary coil with an interruption of the primary power supply can also be caused by thermal or mechanical damage of the primary coil, which results in an increased ohmic winding resistance $R_P$, or by defects in components of the balancing circuit 15, even if a conductive foreign body 11 is not present. In order to detect this type of defect and to distinguish it from the presence of a foreign body, provision is made in accordance with the invention so that after the sending of a report that indicates the presence of a foreign body to the vehicle user and/or a higher level site, the elimination of the foreign body by the vehicle user or service personnel must be confirmed by entry of an acknowledgement signal on an entry unit, before the device returns to its normal operating state and resets the defect indication.

After the entry of such an acknowledgement signal, a renewed detection of the foreign body is immediately undertaken by measuring a decay process with a short-term activated and then interrupted primary-side power supply. If this measurement again produces an abnormally high power loss, then this indicates a defect on the primary coil 2 or in the balancing circuit 15, which is reported to the vehicle user or the service personnel by a corresponding display or defect report, which differs from the display of a foreign body. In this way, the invention also makes possible, without significant additional expense, the detection of hardware defects on the primary side of a device for inductive energy transmission, in particular, the detection of damage to the primary coil 2, which is exposed to mechanical damage at a charging station for electric vehicles 1, as a result of its exposed position of danger.

From the preceding description, variation possibilities in the implementation of the invention can be deduced for the specialist. Thus, for example, the circuit topology of the balancing circuit 15 can be modified while retaining the characteristics of an oscillating circuit in combination with the primary coil and can be expanded in comparison to the example shown here. Furthermore, with the calculation of the power loss, iron losses can be taken into consideration in field conducting elements, in that in the power loss calculation, one of two different exponents, that is, the somewhat larger exponent of the effective value $I_{Peff}$ of the current, is used. Furthermore, the envelope curve or the effective value $I_{Peff}$ of the primary current $I_P$ can be approximated by variables that can be ascertained simply with measurement technology, for example, the envelope curve, by the difference of two successive peak values or the effective value via the rectifier value, which, as is known, is proportional to the effective value. These and comparable modifications are familiar to the specialist and are covered by the patent claims.

The invention claimed is:

1. A method for detection of an electrically-conductive foreign body in a magnetic field of a device for inductive transmission of electrical energy from a stationary unit having a power supply unit and a primary coil to a mobile unit having a secondary coil and an electric consumer, the method comprising:

feeding an electrical current from the power supply unit into the primary coil;

interrupting feeding of the electrical current into the primary coil, the interruption causing decay in an electrical-operating magnitude of the primary coil;

measuring progression of the decay over time;

comparing at least one parameter of the measured progression with a corresponding parameter of a reference progression, the reference progression determined by interruption of feeding of the electrical current from the power supply unit into the primary coil in absence of an electrically-conductive foreign body in a region of a magnetic field produced by the primary coil;

establishing whether an electrically-conductive foreign body is present in the region of the magnetic field produced by the primary coil from an amount of decay in the electrical-operating magnitude of the primary coil as compared to an amount of decay shown by the reference progression;

sending a report to a higher unit or to a user of the device if presence of an electrically-conductive foreign body is established, the report indicating the presence of the electrically-conductive foreign body;

determining, in the presence of the electrically-conductive foreign body, an amount of power absorbed by the foreign body during normal operation of the device from the progression of decay over time in the electrical-operating magnitude of the primary coil;

reducing, according to the determined amount of power absorbed by the foreign body, electrical current fed into the primary coil so that power absorbed by the foreign body remains below a pre-determined threshold;

inputting a signal acknowledging a foreign-body effect free state of the device;

repeating steps for detection of an electrically-conductive foreign body; and sending an error report to the higher unit or to the user of the device if the presence of the electrically-conducive foreign body is repeatedly established, the repeated establishment of the presence of the electrically-conductive foreign body indicating a fault state of the device rather than physical presence of an electrically-conductive foreign body.

2. The method according to claim 1, further comprising confirming presence of the electrically-conductive foreign body when a difference between the parameter of the measured progression and the corresponding parameter of the reference progression exceeds a pre-determined threshold.

3. The method according to claim 1, wherein the at least one parameter of the measured progression is a relative change in an envelope curve of progression over time or is an effective value of a measured electrical operating magnitude within a pre-determined interval of time which begins at or shortly after beginning of the interrupting of feeding of the electrical current.

4. The method according to claim 1, wherein the at least one parameter of the measured progression is length of an interval of time beginning at the interrupting of feeding of the electrical current or shortly thereafter within which an envelope curve of progression over time or an effective value of a measured electrical operating magnitude reaches a pre-determined relative change.

5. The method according to claim 1, wherein the at least one parameter of the measured progression is a value of an ohmic resistance $R_F$ serving as a model for an electrically-conductive foreign body positioned in series with the primary coil and calculated according to formula:

$$R_F = [2L_P/(\Delta t)] \cdot \ln\ [(I_{ref} \cdot I_{0F})/(I_1 \cdot I_0)],$$

wherein $L_P$ is a value of inductance of the primary coil, $\Delta t$ is a length of a pre-determined time interval, $I_0$ and $I_{0F}$ are amplitude or an effective value of a primary current $I_P$ before or shortly after interruption of a power feed-in without presence of the foreign body or with presence of the foreign body, and $I_{ref}$ and $I_1$ are values at which an envelope curve or an effective value of the primary current $I_P$ decays within the time interval $\Delta t$ after interruption of the power feed-in without the presence of a foreign body or with the presence of the foreign body.

6. The method according to claim 1, wherein the electrical-operating magnitude is a current $I_p$ through the primary coil or a voltage $U_p$ across the primary coil.

7. The method according to claim 1, wherein, if measurement of the amount of power absorbed by the foreign body during normal operation of the device exceeds a pre-determined threshold, the feeding of the electrical current into the primary coil remains interrupted.

8. The method according to claim 1, further comprising reducing the electrical current fed into the primary coil to a value that is smaller or, at most, equal to a value $I_{Pmax}$, which is calculated according to formula:

$$I_{Pmax} = \sqrt{\frac{P_{Fmax}}{\frac{2L_P}{\Delta t} \ln\left(\frac{I_{ref} \cdot I_{0F}}{I_1 \cdot I_0}\right)}}\ ;$$

wherein $P_{Fmax}$ is a maximum permissible value of power consumed by the foreign body; $L_P$ is a value of inductance of the primary coil; $\Delta t$ is a length of a pre-determined time interval; $I_0$ and $I_{0F}$ are amplitude or an effective value of primary current $I_P$ before or shortly after interruption of a power feed-in without presence of a foreign body or with presence of the foreign body and $I_{ref}$ and $I_1$ are values at which an envelope curve or an effective value of the primary current $I_P$ decays within the time interval $\Delta t$ after the interruption of the power feed-in without the presence of a foreign body or with the presence of the foreign body.

9. The method according to claim 1, further comprising interrupting delivery of power from the secondary coil to the electric consumer before interrupting feeding of electrical current into the primary coil.

10. The method according to claim 9, wherein the interrupting delivery of power from the secondary coil to the electric consumer is due to short-circuiting of the secondary coil or to breaking of a circuit between the secondary coil and the electric consumer.

11. The method according to claim 1, further comprising producing a resonant electrical circuit without any external excitation by interrupting feeding of the electrical current into the primary coil.

12. The method according to claim 11, wherein progression of the measured electrical-operating magnitude has a form of decaying oscillation of the resonant electrical circuit.

13. The method according to claim 1, further comprising arranging at least one measuring coil adjacent the primary coil to effect measurement of the progression over time of the decay in electrical-operating magnitude caused by interrupting feeding of the electrical current into the primary coil.

14. A device for inductive transmission of electrical energy from a stationary unit having a power supply unit and a primary coil to a mobile unit having a secondary coil and an electric consumer, wherein the device is configured and arranged for execution of the method according to claim 1.

15. A method for detection of an electrically-conductive foreign body in a magnetic field of a device for inductive transmission of electrical energy from a stationary unit having a power supply unit and a primary coil to a mobile unit having a secondary coil and an electric consumer, the method comprising:

feeding an electrical current from the power supply unit into the primary coil;

interrupting feeding of the electrical current into the primary coil, the interruption causing decay in an electrical-operating magnitude of the primary coil;

measuring progression of the decay over time;

comparing at least one parameter of the measured progression with a corresponding parameter of a reference progression, the reference progression determined by interruption of feeding of the electrical current from the power supply unit into the primary coil in absence of an electrically-conductive foreign body in a region of a magnetic field produced by the primary coil;

establishing whether an electrically-conductive foreign body is present in the region of the magnetic field produced by the primary coil from an amount of decay in the electrical-operating magnitude of the primary coil as compared to an amount of decay shown by the reference progression;

determining, in the presence of the electrically-conductive foreign body, an amount of power absorbed by the foreign body during normal operation of the device from the progression of decay over time in the electrical-operating magnitude of the primary coil; and reducing, according to the determined amount of power absorbed by the foreign body, electrical current fed into the primary coil so that power absorbed by the foreign body remains below a pre-determined threshold;

wherein the at least one parameter of the measured progression is a value of an ohmic resistance $R_F$ serving as a model for an electrically-conductive foreign body positioned in series with the primary coil and calculated according to formula:

$$R_F = [2L_P/(\Delta t)] \cdot \ln\ [(I_{ref} \cdot I_{0F})/(I_1 \cdot I_0)],$$

wherein $L_P$ is a value of inductance of the primary coil, $\Delta t$ is a length of a pre-determined time interval, $I_0$ and $I_{0F}$ are amplitude or an effective value of a primary current $I_P$ before or shortly after interruption of a power feed-in without presence of the foreign body or with presence of the foreign body, and $I_{ref}$ and $I_1$ are values at which an envelope curve or an effective value of the primary current $I_P$ decays within the time interval Δt after interruption of the power feed-in without the presence of a foreign body or with the presence of the foreign body.

16. A device for inductive transmission of electrical energy from a stationary unit having a power supply unit and a primary coil to a mobile unit having a secondary coil and an electric consumer, wherein the device is configured and arranged for execution of the method according to claim 15.

17. A device for inductive transmission of electrical energy from a stationary unit having a power supply unit and a primary coil to a mobile unit having a secondary coil and an electric consumer, comprising:
- means for feeding an electrical current from the power supply unit into the primary coil and for subsequent interruption of this feeding;
- means for measuring progression over time of decay of an electrical-operating magnitude of the primary coil caused by interruption of the feeding of electrical current thereto;
- means for comparing at least one parameter of the measured progression of decay with a corresponding parameter of a reference progression, the reference progression determined by interruption of feeding of electrical current into the primary coil in absence of an electrically-conductive foreign body in a region of a magnetic field produced by the primary coil;
- means for establishing whether an electrically-conductive foreign body is present in the region of the magnetic field produced by the primary coil from an amount of decay in the electrical-operating magnitude of the primary coil as compared to an amount of decay shown by the reference progression;
- means for sending a report to a higher unit or to a user of the device if presence of an electrically-conductive foreign body is established, the report indicating the presence of the electrically-conductive foreign body;
- means for determining an amount of power absorbed by the foreign body during normal operation of the device from the progression of decay over time in the electrical-operating magnitude of the primary coil;
- means for reducing electrical current fed into the primary coil so that power absorbed by the foreign body remains below a pre-determined threshold;
- means for inputting a signal acknowledging a foreign-body effect free state of the device;
- means for carrying out repeated steps for detection of an electrically-conductive foreign body; and
- means for sending an error report to the higher unit or to the user of the device if the presence of the electrically-conducive foreign body is repeatedly established, the repeated establishment of the presence of the electrically-conductive foreign body indicating a fault state of the device rather than physical presence of an electrically-conductive foreign body.

* * * * *